United States Patent
Baskey et al.

[19]

[11] Patent Number: 6,148,410
[45] Date of Patent: Nov. 14, 2000

[54] FAULT TOLERANT RECOVERABLE TCP/IP CONNECTION ROUTER

[75] Inventors: Michael Edward Baskey, Wappingers Falls; Donna Ngar-Ting Dillenberger, Yorktown Heights; German Sergio Goldszmidt, Dobbs Ferry; Guerney Douglass Holloway Hunt, Yorktown Heights; Eric Michel Levy-Abegnoli, Mamaroneck; Jeffrey Mark Nick, Fishkill; Donald William Schmidt, Stone Ridge, all of N.Y.

[73] Assignee: International Business Machines Corporation, Armonk, N.Y.

[21] Appl. No.: 08/929,409

[22] Filed: Sep. 15, 1997

[51] Int. Cl.[7] ....................................................... H02H 3/05
[52] U.S. Cl. .................................... 714/4; 714/4; 714/43; 714/56
[58] Field of Search .............................. 714/3, 4, 47, 56, 714/43, 48

[56] References Cited

U.S. PATENT DOCUMENTS

| | | | |
|---|---|---|---|
| 5,371,852 | 12/1994 | Ahanasio et al. | 395/200 |
| 5,430,727 | 7/1995 | Callon | 370/85.13 |
| 5,444,693 | 8/1995 | Arslan et al. | 370/16 |
| 5,473,599 | 12/1995 | Li et al. | 370/16 |
| 5,509,123 | 4/1996 | Dobbins et al. | 395/200.15 |
| 5,644,571 | 7/1997 | Seaman | 370/401 |
| 5,680,332 | 10/1997 | Raimi et al. | 364/578 |
| 5,752,241 | 5/1998 | Cohen | 707/3 |
| 5,771,227 | 6/1998 | Benayoun et al. | 370/25 |
| 5,805,594 | 9/1998 | Kotchey et al. | 370/401 |
| 5,825,772 | 10/1998 | Dobbins et al. | 370/396 |
| 5,835,696 | 11/1998 | Hess | 395/182.08 |
| 5,841,775 | 11/1998 | Huang | 370/422 |
| 5,951,649 | 9/1999 | Dobbins et al. | 709/238 |

OTHER PUBLICATIONS

J. Weiss, "High–Speed Lan Internetworking", Netwok Management, pp. 66–72, Dec. 1989.

Andreas C. Doring et al, A Flexible Approach for a Fault Tolerant Router, IEE, Fall Joint Computers Conference, pp. 694–714, 1968.

Chalasari, Suresh et al., "Fault Tolerance with Multimodule Router", IEEE, pp. 201–210, Apr. 1996.

T. Liu et al., "Optimal Switching Networks for WSI Architectures W Fault Tolerant Path Routing", 1995 Proceedings, Seventh Annual IEEE Interconference, IEEE pp. 153–162, Jan. 1995.

Kevin Bolding et al. Parallel Computer Routing & Communication, Parallel Computer Routing & Comms., First Internation, pp. 227–240, May 16, 1994.

Primary Examiner—Norman M. Wright
Attorney, Agent, or Firm—Scully, Scott, Murphy & Presser; David M. Shofi, Esq.

[57] ABSTRACT

A fault tolerant recoverable connection device and methods are disclosed that include a primary router in an active state to provide a connection between clients and servers in a network, and a backup router in a standby state. The states of the primary and backup routers are switched when the primary router fails, the backup router has a better reachability state than the primary router, or by an operator command. Each router has a synchronization manager which maintains synchronized tables between the active and standby routers; a monitoring manager which monitors and switch the state of the routers; a reach-ability manager which monitors, updates, and compares the reach-ability set and state of the routers; and a keep alive manager which monitors the routers to provide a status notification to the monitoring manager.

32 Claims, 5 Drawing Sheets

FAULT TOLERANT RECOVERABLE TCP/IP CONNECTION ROUTER

BACKGROUND OF THE INVENTION

1. Field of the Invention

The present invention is directed to a Fault Tolerant Recoverable TCP/IP Connection Router (FTR-CR) and methods of connecting at least two FTR-CRs to multiple systems, where the FTR-CRs have synchronized internal tables and are capable of switching between active and standby states.

2. Discussion of the Prior Art

A conventional Transport Control Protocol/Internet Protocol connection router (TCP-CR) connects clients making requests to servers that satisfy the requests. The requests are configured as IP packets for transport in a system running TCP/IP, such as the Internet. The TCP-CR forwards TCP/IP connection requests to multiple servers based on workload capacity information, server capabilities, balancing algorithms and availability of the servers.

For proper operation, the TCP-CR examines all IP packets on the way from the clients to the servers, and keeps track of all established connections. The TCP-CR appears to any previous hop router as the last hop. In addition, the TCP-CR appears to clients as the end point of all the TCP connections.

Problems arise when the TCP-CR fails as described below. Conventional IP recovery mechanisms for recovery of a failed TCP-CR include address resolution protocol (ARP) aging, and various routing protocols. Additional conventional recovery mechanisms require either a shared recoverable file system to store state information, or the reconstruction of host connection information by the systems in the cluster of servers.

These conventional recovery schemes are slow to recover for new connections, do not recover existing connections, and do not recover for reach-ability failures as defined below. Consequently, conventional IP recovery mechanisms do not provide a complete solution to TCP-CR failures.

Accordingly, there is a need for a TCP-CR failure recovery scheme which is fast and efficient, allows quick recovery for both new and existing connections, and recovers for reach-ability failures.

SUMMARY OF THE INVENTION

The object of the present invention is to provide a fault tolerant recoverable TCP-CR (FTR-CR) and failure recovery methods that eliminate the problems of conventional TCP-CRs.

Another object of the present invention is to provide an FTR-CR and router failure recovery methods that do not require reconstruction of state information for fault recovery.

Yet another object of the present invention is to provide an FTR-CR and router failure recovery methods that do not require a shared recoverable file system.

A further object of the present invention is to provide an FTR-CR and router failure recovery methods that do not require changes to the cluster of servers.

A still further object of the present invention is to provide an FTR-CR and router failure recovery methods that include recovery from reach-ability failures.

These and other objects of the present invention are achieved by a fault tolerant recoverable connection device and methods that include a primary router in an active state to provide a connection between clients and servers in a network, and a backup router in a standby state. The state of the primary and backup routers are switched when the primary router fails, the backup router has a better reach-ability state than the primary router, or by an operator command.

Each router has a synchronization manager which synchronizes internal tables of all the routers; a monitoring manager which monitors and switch the state of the routers; a reach-ability manager which updates and compares the reach-ability set and state of the routers; and a keep alive manager which monitors the routers to provide a status notification to the monitoring manager.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
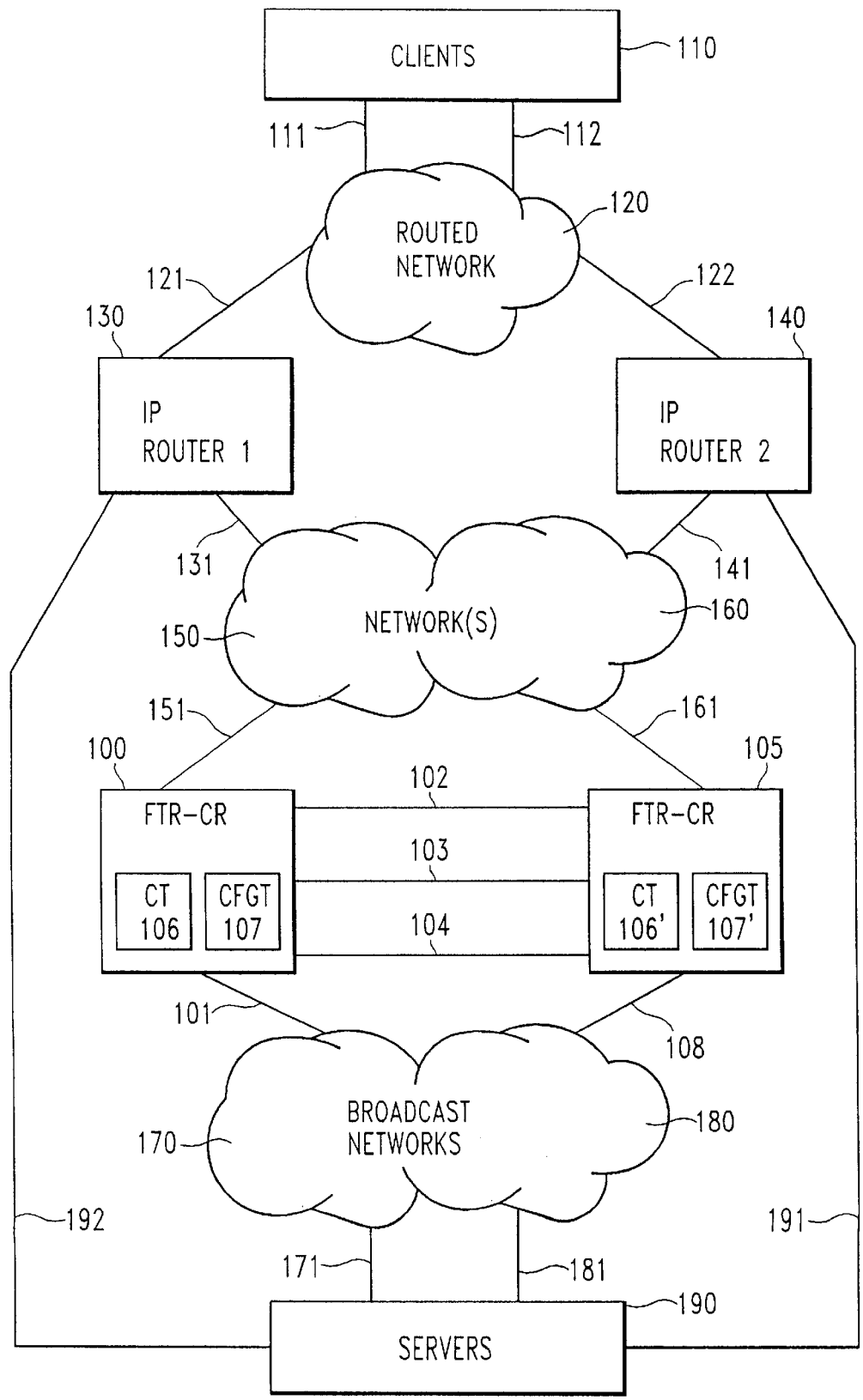
FIG. 1 shows fault tolerant recoverable connection routers (FTR-CRs) and their working environment according to one embodiment of the present invention.

FIG. 1 shows an environment where at least two fault tolerant recoverable TCP/IP connection routers (FTR-CRs) 100, 105 are deployed for interconnecting clients 110 and servers 190. As shown in FIG. 1, clients 110 are connected, via links referenced as numerals 111 and 112, to a routed network 120, which is in turn connected by links 121, 122 to one or more last hop Internet Protocol (IP) routers, shown in FIG. 1 as IP Router 1 130 and IP Router 2 140. Links 131, 141 connect the last hop routers 130, 140, to networks 150, 160, respectively. In turn, the networks 150, 160 are connected by links 151, 161 to at least two FTR-CRs 100, 105, respectively.

One of the two FTR-CRs 100, 105 is in an active state, while the other is in a standby state. The active FTR-CR is routing requests, while the standby FTR-CR is monitoring the status of the active FTR-CR. The standby FTR-CR does not route request. Illustratively, the active FTR-CR is designated as numeral 100, while the standby FTR-CR is designated as numeral 105. Both active and standby FTR-CRs 100 and 105, respectively, contain identical internal tables, such as configuration tables 107, 107' and connection tables 106, 106', and are also optionally interconnected directly by links 102, 103, 104. The two FTR-CRs 100, 105 are also interconnected indirectly through the external networks 150, 160 and the broadcast networks 170, 180. The networks 150, 160 can be directly interconnected to each other. Similarly, the broadcast networks 170, 180 can be directly interconnected to each other.

In this example, the active and standby FTR-CRs 100, 105 are connected via links 101, 108 to the broadcast networks 170, 180, which are in turn connected, via links 171, 181, to the same set or cluster of servers 190. These servers 190 can be an operating system/390 (OS/390) system, a scalable power parallel (SP/2) system, a new technology (NT) cluster, a Unix cluster, or a heterogeneous cluster of workstations/personal computers (PCS). The two FTR-CRs 100, 105 can each reach both broadcast networks 170, 180. In addition to being connected to the last hop IP routers 130, 140 through the FTR-CRs, 100, 105, the servers 190 also have independent direct routes or connections via links 191, 192, back to the last hop IP routers 130, 140.

Each FTR-CR 100, 105 is assigned a function and a state on a per Virtual Encapsulated Cluster (VEC) basis. Functionally, each FTR-CR can be either a primary or a backup. Regardless of the function, an FTR-CR can either be in the active or the standby state. The active FTR-CR is the one which is currently distributing client requests to the cluster of servers 190. The standby FTR-CR is awaiting the failure of the active FTR-CR.

The function is assigned at configuration time, all other things being equal, an FTR-CR is configured as primary if it is the preferred active FTR-CR and backup otherwise. Configuration policy is not restricted.

The standby FTR-CR 105 monitors major activities of the active FTR-CR 100, so that the configuration and connection tables 107, 106 of both the active and standby FTR-CRs 100, 105 are synchronized. This allows the standby FTR-CR 105 to switch states and become the active FTR-CR, when the original active FTR-CR 100 fails.

Figure 2:
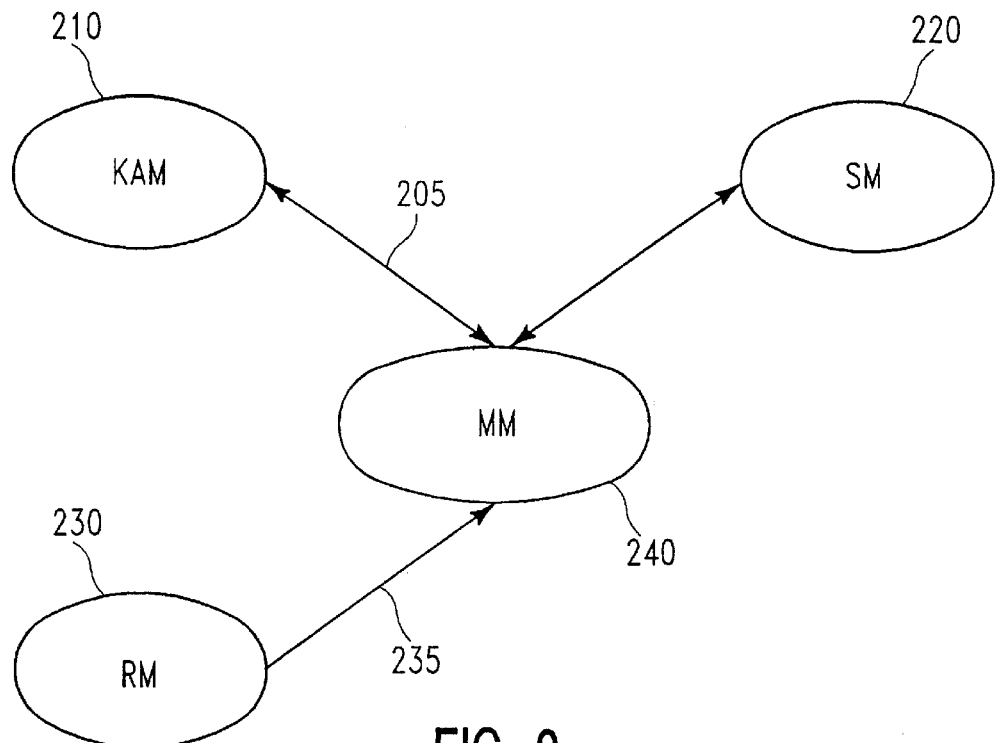
FIG. 2 illustrates in greater detail the FTR-CR shown in FIG. 1 according to the present invention.

FIG. 2 illustrates the interaction between the main components of an FTR-CR, such as one of the two FTR-CRs 100, 105 shown in FIG. 1, which are identical to each other. These main components, shown in FIG. 2, are in addition to other components of a conventional TCP-CR. As shown in FIG. 2, the FTR-CR includes a synchronization manager (SM) 220 that synchronizes internal tables 106, 107 (FIG. 1) of the FTR-CR. The SM 220 is connected to a monitoring manager (MM) 240 which monitors the state of its own FTR-CR.

The objective of the MM 240 is to ensure that a FTR-CR is active at all times, particularly after a failure has occurred. To achieve this, the MM 240 keeps track of the current state of its FTR-CR and responds to the failure of the active FTR-CR. The MM 240 can receive failure indications from a reach-ability manager (RM) 230 and a keep alive manager (KAM) 210, as described below. The MM 240 can be either on a separate system or integrated in all the FTR-CRs as shown in FIG. 2. In the following description, it is assumed that the MM 240 is integrated. Further, it is assumed that the FTR-CR 100 (FIG. 1) has been configured as primary and initially active, and that FTR-CR 105 (FIG. 1) has been configured as backup and is initially standby.

Considering the case when the MM 240 at the standby FTR-CR 105 detects that the active FTR-CR 100 has failed, or when an operator enters a command directing the standby MM 240 in the standby FTR-CR 105 to change from the standby state to the active state, then the standby MM 240 commands the standby FTR-CR 105 to become active. The MM 240 of the FTR-CR 105, which was previously the standby FTR-CR, informs the MM of the FTR-CR 100 to change from the active state to the standby state. Next, FTR-CR 105 performs IP takeover of Virtual Encapsulated Cluster (VEC) IP addresses. The MM of the FTR-CR 100 can also be configured so that after recovering from a failure, FTR-CR 100 will resume as active and FTR-CR 105 will return to the standby state.

As shown in FIG. 2, the FTR-CR also includes a reach-ability manager (RM) 230 which computes reach-ability. There is an RM 230 in each FTR-CR. Using techniques known in the art, a single RM 230 is elected as active. For this discussion, it is assumed that the active RM is initially in the active FTR-CR, and when a standby FTR-CR becomes active, then the RM in the previously standby FTR-CR becomes the active RM. The active RM collects from all the FTR-CRs their current reach-ability information, which includes for each FTR-CR its current reach-ability state and the current reach-ability set. The reach-ability set is the configured list of hosts or subnets that must be monitored for reach-ability. The current reach-ability state is the subset of the reach-ability set that is currently reachable.

The active RM compares the current reach-ability state and the current reach-ability set of each FTR-CR using a configurable function to determine which of the FTR-CRs has the best reach-ability. If the active RM determines that an FTR-CR other than the currently active FTR-CR has the best or better reach-ability than the active FTR-CR's reach-ability, then the active RM tells the RM of the FTR-CR with the best reach-ability to become the active FTR-CR, and tells its own MM, as well as all the RMs of all the other standby FTR-CRs, to become standby (switch-over).

Further, the FTR-CR shown in FIG. 2, has the keep alive manager (KAM) 210. The KAM 210 is in charge of monitoring the peer FTR-CRs over all the configured network links using techniques known in the art. The KAM 210 generates events, such as failure/alive notifications, that are sent to the MM 240 via connection 205 shown in FIG. 2.

Instead of the MM 240 being integrated in each FTR-CR, an external MM 240' can be provided. If the MM is external, then fault tolerance is provided using techniques known in the art.

The MM, whether integrated 240 or external 240', detects the failure of the active FTR-CR and activates the standby FTR-CR, which transparently replaces the failed FTR-CR. An additional external computer host is not required, because the MM can be integrated into each FTR-CR. For simplicity, the following discussion is directed to an MM 240 which is integrated within each FTR-CR. However, it is understood by those skilled in the art that the discussion is equally applicable to an external MM communicating with FTR-CRs that do not have internal integrated MMs.

The SM 220 of the active FTR-CR synchronizes the relevant internal data of its local FTR-CR with the SM of the standby FTR-CR and sends periodic updates to the standby FTR-CR. The SM 220 in the standby FTR-CR initializes the internal tables of its local FTR-CR with the synchronization data received from the SM of the active FTR-CR. Next, the standby FTR-CR uses the periodic updates to update its tables. The internal data or tables of the active and standby routers 100, 105 are synchronized, for example, by communicating configuration information between the two routers. The synchronized tables dispense with the need to reconstruct configuration information of the primary router by the backup router when the primary router fails. This prevents delays in recovery of requests distributions.

Further, having active and standby routers with synchronized tables provides fault tolerance for several types of TCP-CR failures that cannot be corrected with conventional methods. For those failure types that are correctable with conventional TCP-CRs, the correction method using the FTR-CRs is generally faster.

The failures addressed using the FTR-CRs include the following failures of systems using conventional TCP-CRs:

1. TCP-CR system failure, such as central processing unit (CPU) and software failures, where all existing connections from clients to servers are lost.

2. Connectivity failures between various connection points, such as:

(a) Between the TCP-CR and the previous hop IP router. If there is no alternative route to this TCP-CR, or if the TCP-CR and the previous hop IP routers are on the same subnet, all existing connections from clients to servers are lost and new connections will not get established.

These Connectivity failures may be due to TCP-CR network adapter to the previous hop IP router; previous hop IP router adapter failure; or link failure between the TCP-CR and the previous hop IP router.

(b) Between the TCP-CR and a server (network adapter at the server, network adapter at the TCP-CR or link failure). Existing connections will be lost and new connections will not get established.

3. Reach-ability failures which are defined by an administrator policy. When a TCP-CR can no longer reach (or be reached by) an element of the reach-ability set (which is defined by an administrator), this is considered to be an installation specific policy failure.

These and other failures are corrected by having at least two FTR-CR, namely, primary and backup FTR-CRs, where the backup FTR-CR will continue to distribute connections to the same cluster of servers in the event of a failure of the primary FTR-CR. This is achieved without the need of a shared, recoverable file system and without any changes to the cluster of servers.

For simplicity, the case where only two FTR-CRs is described below. However, it is understood that more that two FTR-CRs may be used instead of two FTR-CRs per cluster of servers, where one of the FTR-CRs is elected to be in the active FTR-CR and the rest of the FTR-CRs are in the standby state.

The two FTR-CRs are connected to the same clients and servers. In the case where the MM 240 is integrated within each FTR-CRs, the two FTR-CR hosts are also interconnected. Each FTR-CR is capable of detecting the above failures. When a failure occurs which requires a switch-over, IP takeover of the VEC IP address(es) is performed.

The two FTR-CRs 100, 105 shown in FIG. 1 provide redundant processing elements for recovering from a failure of the primary FTR-CR, which includes reach-ability failures and adapter failures, while assuring TCP connection recovery.

The two FTR-CRs 100, 105 mask the effects of failures that occur between the last hop IP router 130 or 140, which is located before the FTR-CRs 100, 105 and the servers 190, which are associated with the FTR-CR from clients 110, so that existing connections are not affected, and new connections can continue to be established.

To achieve recovery of active connections, two or more FTR-CRs must be reachable by the same clients, be able to reach the same servers, and be interconnected (either directly or indirectly). Each active synchronization manager (SM) 220, shown in FIG. 2, exchanges data with the corresponding standby SM to synchronize the internal FTR-CR databases of the two FTR-CRs 100, 105. The standby SM is the SM of the standby FTR-CR 105.

Operation of the two FTR-CRs 100, 105 (FIG. 1) is now explained. The primary FTR-CR 100 is initially in the active state, and the backup FTR-CR 105 is initially in the standby state. The FTR-CR includes elements of a conventional TCP-CR in addition to the KAM 210, SM 220, RM 230 and MM 240, as shown in FIG. 2. The MM 240' may be external instead of being integrated within the FTR-CR.

Figure 5:
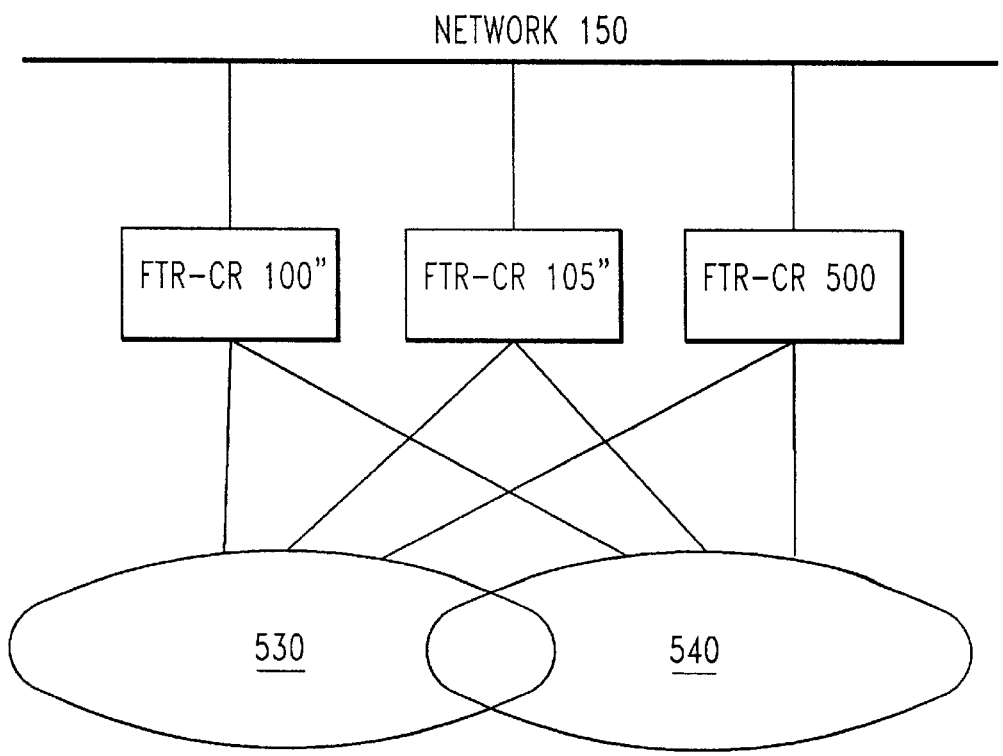
FIG. 5 illustrates an alternate deployment of several FTR-CRs shown in FIG. 2 according to the present invention.

Similar to conventional TCP-CRs, the FTR-CR exports a virtual encapsulated cluster (VEC), via a virtual IP (VIP) address, and support multiple VECs. In addition, unlike conventional TCP-CRs, the FTR-CR includes fault tolerance and recovery on a per VEC or VIP basis. Consequently, the FTR-CRs can be applied in different ways. For example, as shown in FIG. 5, there could be two primary FTR-CRs 100", 105" with a third FTR-CR 500 which is configured as the backup for both primary FTR-CRs 100", 105". There can also be a single primary with multiple backups. In this case, it is the responsibility of the MM, using conventional techniques known to the art, to elect a new active FTR-CR from the set of backup FTR-CRs upon detecting a failure of the active FTR-CR.

In the following discussion regarding the operation of the primary/active and backup/standby FTR-CRs 100, 105, shown in FIG. 1, synchronization is performed entirely with messages between the SM of the active FTR-CR 100 and the SM of the standby FTR-CR 105, for example. However, if the FTR-CRs 100, 105 are connected to a broadcast network 170, as shown in FIG. 1, then these messages are only used to initially synchronize the connection table 106' of the standby FTR-CR with the active FTR-CR.

After initial synchronization, the SM of each FTR-CR uses explicit messages to maintain synchronization of the internal data structures of all the FTR-CRs, such as the configuration tables 106, 107 shown in FIG. 1.

If the standby FTR-CR 105 is connected to a broadcast network 170 as described above, then, after initial synchronization, the standby FTR-CR 105 can listen to the actions taken by the active FTR-CR 100, using conventional techniques known in the art, and maintains synchronization of its connection table directly, instead of using synchronization updates from the active FTR-CR 100. The standby FTR-CR 105 does not take any action on these packets other than using the information in the packets to maintain the connection tables of the standby FTR-CR 105 identical to and synchronized with the connection tables of the active FTR-CR 100.

Figure 3:
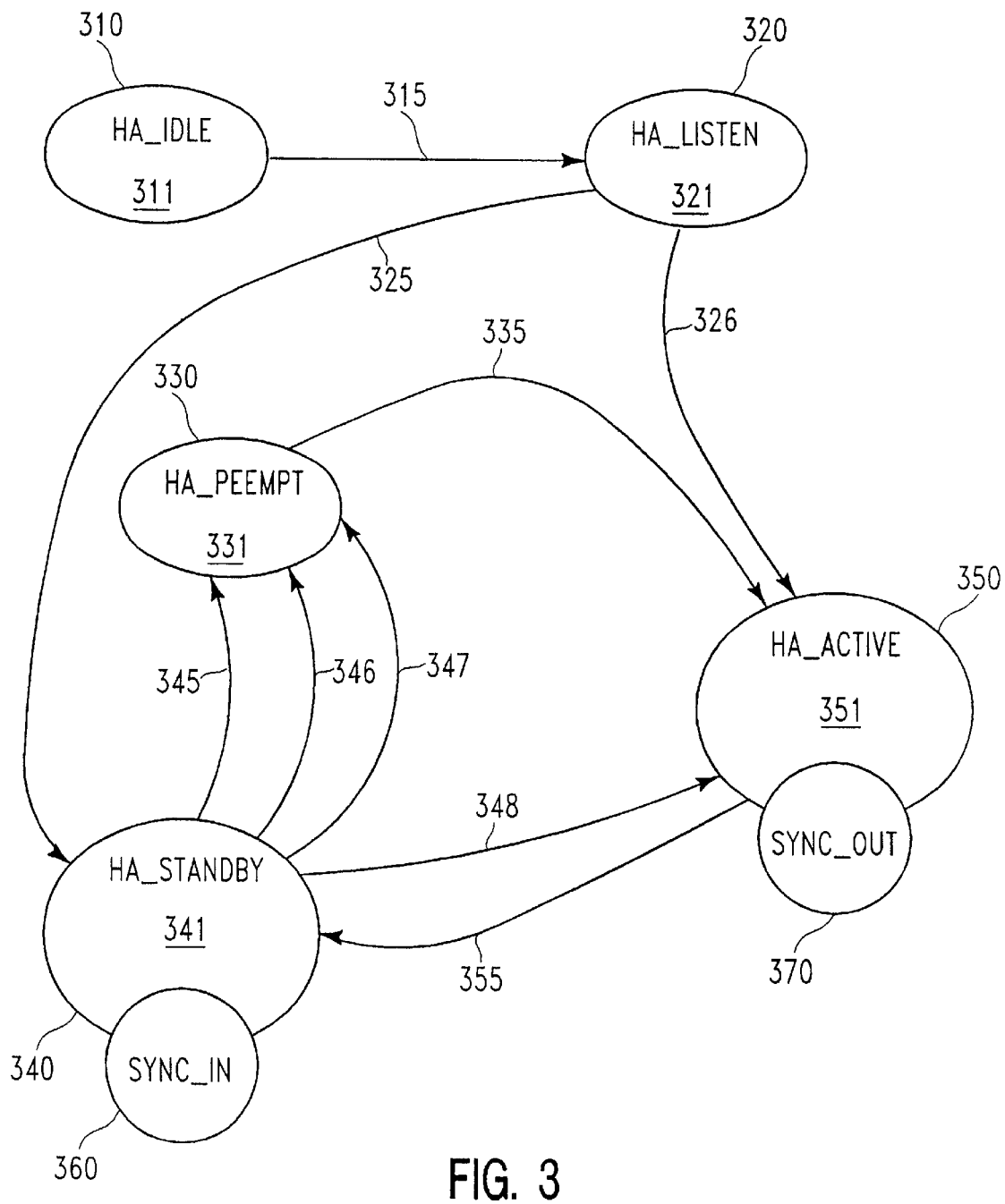
FIG. 3 illustrates a Finite State Machine of the monitoring manager of the FTR-CR shown in FIG. 2 according to the present invention.

Instead of automatically switching functions and states when necessary, upon detection of a failure or better reachability set, switching functions and states of the two FTR-CR 100, 105 is performed in response to an operator commands to the MM, as shown by reference numeral 347 in FIG. 3. Automatic detection by the active RM or MM of the active FTR-CR failure is described below. However, function and state switch-over can be triggered by a failure detected by the standby RM or MM, or triggered by the operator command.

This invention allows the designation of primary/active and backup/standby, to be based on workload information received by the two FTR-CR 100, 105. Illustratively, the workload information or recommendations are a function of capacities, availability, and importance level of work running on the servers 190. For example, a conventional TCP-CR monitors the workload associated with each VEC.

This information can be used by the two FTR-CR 100, 105 to dynamically change the designation of primary/active and backup/standby.

In a configuration where there are two properly connected FTR-CRS, such as the configuration shown in FIG. 1, where each FTR-CR 100, 105 is connected to same clients 110, and the same servers 190, and connected to each other in the case where the MM 240 (FIG. 2) is integrated within the FTR-CR instead of being external thereto, initially one FTR-CR 100 is the primary FTR-CR and is in the active state, while the other FTR-CR 105 is the backup FTR-CR and is in the standby state. The primary FTR-CR 100 is properly functioning, similar to conventional TCP-CRs for the configured VECs. As part of this normal operation, the internal data structures of backup FTR-CR 105 are continuously being updated and synchronized with the internal data of the primary FTR-CR 100.

Returning to FIG. 2, the keep alive manager (KAM) 210 is in charge of monitoring the peer FTR-CRs over all the configured network links. The KAM 210 generates events, such as failure/alive notifications, that are sent via connection 205 to the MM(240). The SM 220 synchronizes the FTR-CR internal databases, such as configuration and connection tables, so that the tables of the two FTR-CRs 100, 105 (FIG. 1) are identical, according to the instructions given by the MM 240. The RM 230 detects and handles reach-ability failures, and informs the MM 240 via connection 235 of reach-ability events. The MM 240 elects the active and standby FTR-CRs and coordinates the actions of all the other components.

In particular, the MM 240 ensures that at least one FTR-CR is active at all times, particularly after a failure has occurred. To achieve this, the MM 240 keeps track of the current state of each FTR-CR and detects the failures of active FTR-CRs. The MM 240 can also receive failure indications from the RM 230 as described below.

The MM can be either external to the FTR-CR on a separate system, or integrated in each FTR-CR, as shown in FIG. 2. The following description is directed to the case where the MM 240 is integrated in each FTR-CR.

When the backup/standby MM 240, i.e. the MM 240 of the backup/standby FTR-CR 105 (FIG. 1) detects that the active FTR-CR 100 has failed, or when an operator enters a command directing the backup MM 240 to change the backup FTR-CR 105 from the standby state to the active state, then backup MM 240 commands the backup FTR-CR 105 to become active. Next, the previously backup FTR-CR 105 performs IP takeover of the VEC IP addresses. The MM 240 can also be configured so that after recovering from a failure, the original primary FTR-CR 100 returns from the standby state to the active state and the now primary FTR-CR 105 returns from the active state back to the standby state.

Two methods are used to perform IP takeover, depending on whether the previous hop IP router 130 or 140 (FIG. 1) is on the same subnet as the VEC IP addresses, namely, gratuitous ARP and IP address advertising. In both cases, the failed primary FTR-CR host 100 will no longer advertise the VEC IP addresses, either because it can't due to the failure, or because it has been instructed not to by the MM 240 of the original standby FTR-CR 105.

If the primary and backup FTR-CRs 100, 105 receive client requests on the same logical subnet, the standby FTR-CR 105 performs IP takeover by issuing a gratuitous ARP message, i.e, an ARP request to itself. The gratuitous ARP message is broadcasted to all directly attached networks belonging to the logical subnet of the VEC. This causes the previous hop(s) IP router(s) 130, 140 to immediately update its ARP table. This ARP table update causes all traffic for the VEC to go to the new active (previously standby) FTR-CR 105.

If the VEC IP addresses are on a subnet which is different from the subnet of the previous hop IP router 130, 140, then the standby FTR-CR 105 performs IP takeover by advertising the VEC IP address using the appropriate IP routing protocol known in the art. Because the now active FTR-CR host 105 starts advertising the VEC address, the previous hop(s) IP router 130, 140 updates its routing table and starts sending the traffic to the now active FTR-CR 105.

This eventually causes all IP packets destined to the VEC addresses to flow through the now active FTR-CR 105. Because the now active FTR-CR 105 has equivalent internal connection and configuration data as the failed originally active or now standby FTR-CR 100, the now active FTR-CR 105 can process these redirected packets without interrupting, or with minimal interruption of, the currently active connections. If automatic recovery has been configured, when the originally active primary FTR-CR 100 recovers from its failure, the MM of the recovered primary FTR-CR, which is now in standby state, orders the newly active backup FTR-CR 105 to go back into standby state. Recovery from failures includes synchronizing internal tables.

The SM 220, shown in FIG. 2, ensures that the internal tables, such as the connection and configuration tables 106', 107', shown in FIG. 1, of the standby FTR-CR 105 are functionally equivalent to the tables 106, 107 of the active FTR-CR 100. This is achieved as follows. When an SM 220 of an FTR-CR starts, the SM 220 asks the MM 240 if the FTR-CR is currently in the active state or the standby state. If the FTR-CR is currently in the active state, the SM 220, which is the active SM, waits for a notification that the other, FTR-CR, i.e., the standby FTR-CR, is ready. When this notification arrives, the active SM 220 uses a cache synchronization protocol to transfer the internal tables of its active FTR-CR to the standby SM. Thereafter, the active SM 220 sends periodic updates to the standby SM.

If the FTR-CR is currently in the standby state, the standby SM notifies the active SM that it is available, and receives the aforementioned internal tables' state of the active FTR-CR. The standby SM then uses this data to initialize the internal tables of the standby FTR-CR. The standby SM then continuously receives the periodic updates sent by the active SM and uses them to update the internal tables of the standby FTR-CR.

If both the active and standby FTR-CRs 100, 105 (FIG. 1) are on a network which supports promiscuous mode, then periodic updates of the connection table can be implemented by the standby SM directly listening to the actions taken by the active FTR-CR. Using this method, when the active FTR-CR 100 fails, the most information that can be lost is what would have been contained in the next periodic SM update. The frequency and size of these periodic updates is configurable. For example, an update could be sent for every connection state change.

Turning now to the RM 230, shown in FIG. 2, it handles recovery from the network communication failures described above. This is accomplished by two methods, address substitution and FTR-CR switch over. The administrator of the system provides each FTR-CR with a list of alternate addresses of multi-homed hosts to be used for address substitution, and a list of hosts and subnets that each of the FTR-CR hosts 100, 105 must be able to reach. The list of reachable hosts and subnets is referred to as the reach-ability set.

For address substitution, when the RM 230 detects that an element in the required reach-ability set is unreachable by its FTR-CR using the configured address, the RM 230 checks if the host is reachable using any of the alternate addresses. For instance, reach-ability of alternate addresses can be obtained via Internet control message protocol (ICMP). If there is one such address, the RM 230 updates the internal tables of the active FTR-CR 100 to the alternate address. If there is no such address, then the corresponding server is removed from the current reach-ability state of its FTR-CR.

The active RM 230 collects current reach-ability information from all FTR-CRs, and compares this reach-ability information to the required reach-ability set. The RM 230 executes a configurable function to decide which FTR-CR has the best reach-ability. If there is a change in reach-ability, the active RM tells the RM of the FTR-CR with the best reach-ability to become the active FTR-CR, and tells its own MM, as well as all the RMs of all the other standby FTR-CRs, to become standby (switch-over). Accordingly, if necessary or desired, a switch-over is performed and the FTR-CR with the best reach-ability takes over and becomes active.

FIG. 3 describes a finite state machine contained in the MM 240 shown in FIG. 2. The responsibility of the finite state machine includes keeping track of the state of each FTR-CR and detecting failures. The inputs of the finite state machine are events such as internal timers, and expirations and event reports received from the other components. Illustratively, the finite state machine has five states 310, 320, 330, 340, and 350; two sub-states 360 and 370; five actions 311, 321, 331, 351, and 341; nine transition 315, 325, 326, 335, 345, 346, 347, 348, and 355; four timers t1 through t4; and a decision algorithm 400, which is described in FIG. 4.

The states of the finite state machine include:

310: IDLE. No backup FTR-CR has been configured.

320: LISTEN. A newly activated FTR-CR will start in this state in order to detect if there is an already active FTR-CR.

330: PREEMPT. The standby FTR-CR has informed the active FTR-CR that the standby FTR-CR is going to switch active and is waiting for a response from the current active FTR-CR, or a timer expiration.

340: STANDBY. The FTR-CR is not forwarding packets to the cluster of servers 190 (FIG. 1). Rather, the FTR-CR is monitoring the active FTR-CR to detect a failure, and receiving updates from the active FTR-CR to shadow the connection and configuration information.

350: ACTIVE. The FTR-CR is forwarding packets to the cluster of servers 190 (FIG. 1). The SM of the active FTR-CR is also sending configuration and connection updates to the SM of the standby FTR-CR.

The sub-states are:

360: SYNC-IN. The standby FTR-CR is being synchronized by the active FTR-CR. This occurs when the standby FTR-CR is first initialized, the configuration changes, or whenever the SM in either the active or standby FTR-CR detects that the tables in the active FTR-CR and standby FTR-CR are not synchronized.

370: SYNC-OUT. The Active FTR-CR is synchronizing the standby FTR-CR.

The actions are:

Action 311 is executed whenever an FTR-CR starts (before any configuration command is performed), and whenever the backup FTR-CR function is disabled or deleted. In particular, the following actions are performed: disable receiving of control packets from any peer FTR-CR or MM; and Enable ARP reply or start advertising the VEC IP addresses.

Action 321 is performed whenever the FTR-CR function is enabled. Typically, when the FTR-CR starts, it will reach this state during its initialization. In particular, the following actions are performed: enable receiving of control packets from any peer FTR-CR or MM; disable ARP reply or stop advertising the VEC IP addresses; and start timer t1 to listen for t1 seconds before attempting to become active.

Figure 4:
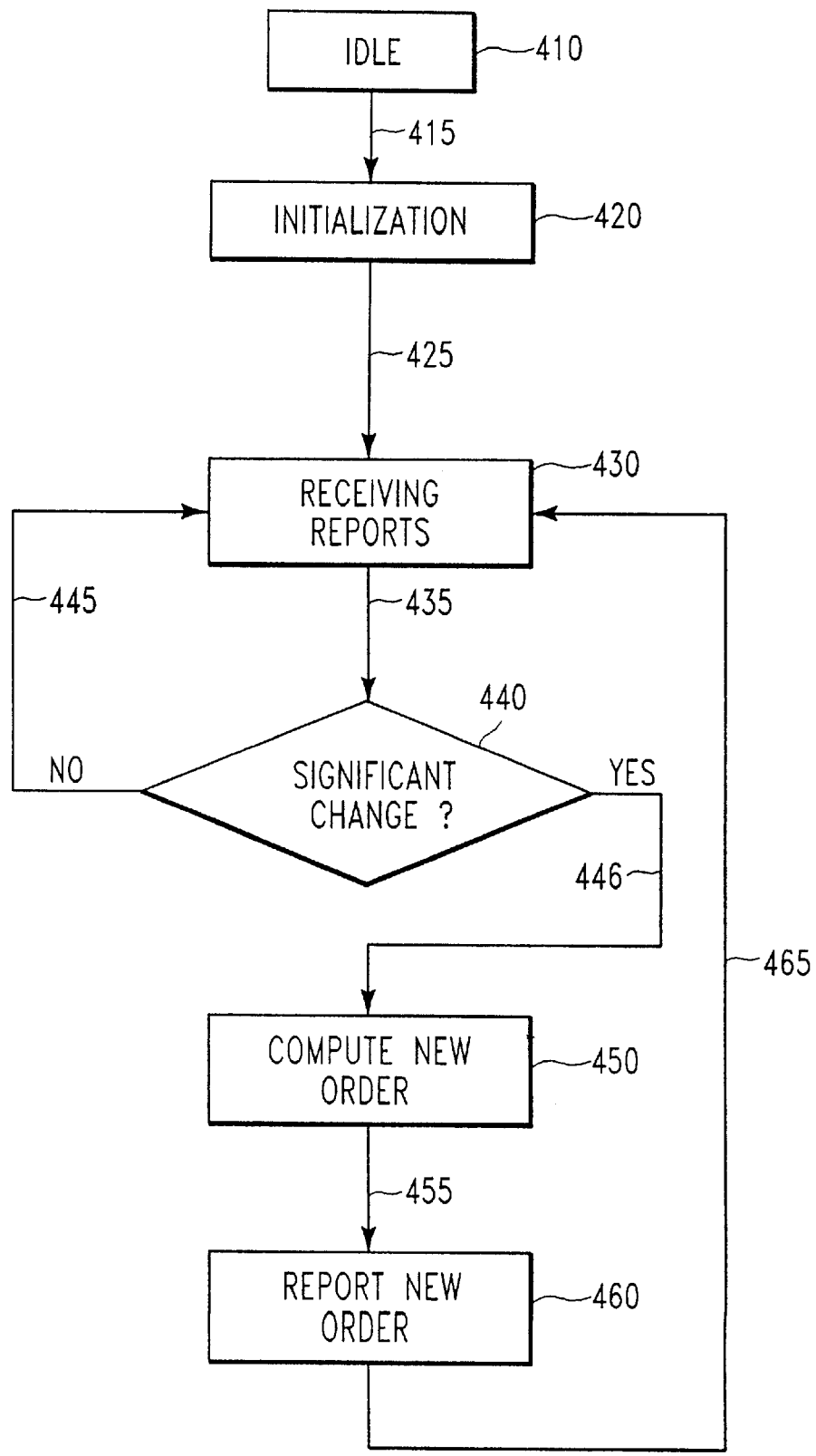
FIG. 4 illustrates a flow chart representing how a reach-ability manager of the FTR-CR shown in FIG. 2 determines reach-ability failures according to the present invention.

Action 331 is executed when the output of the decision algorithm 400, shown in FIG. 4, instructs the standby FTR-CR to become active. In particular, the following actions are performed: send a switch-over query to the active FTR-CR; and start timer t3 (active knowledge failure timer).

Action 351 is executed whenever an FTR-CR becomes active, and when the timer t4 expires. In particular, the following actions are performed: start or restart timer t4 (frequency to send cache updates) and send cache updates and keep alive messages. The cache updates typically contain any changes to connection information, configuration information or reach-ability information (as defined previously). If the sub-state is-OUT, the FTR-CR will consider that everything has changed and dump the entire cache to its peer.

Action 341 is executed whenever an FTR-CR becomes standby; when the timer t2 expires; when a switch-over event 355 is received; or when cache updates are received. In particular, the following actions are performed: start or restart timer t2 (maximum delay between cache updates); and install cache updates in local cache.

The main transition are:

315: The FTR-CR is in the IDLE state, received a configuration command to start. The FTR-CR changes to the LISTEN state and performs action 321 described above.

325: The FTR-CR in the LISTEN state, receives either a keep alive message or a cache update from the another FTR-CR which is in the active state. This FTR-CR in the LISTEN state changes to the STANDBY state and performs action 341. In addition, this FTR-CR sends a query requesting cache synchronization to the active FTR-CR, and sets the sub-state to SYNC-IN.

326: The timer t1 expired while FTR-CR was in LISTEN state. The FTR-CR did not receive any indication that there is an active FTR-CR. Thus, the FTR-CR changes to ACTIVE state while performing action 351; generates either a gratuitous ARP for the cluster address, or starts advertising the cluster address in routing packets.

335: Either the active FTR-CR did not respond to the switch-over query sent by the standby FTR-CR and timer t3 expired, or the active FTR-CR did respond, where accepting the switch-over is the only possible response. In both cases, the standby FTR-CR performs action 351 while changing to active state; generates either a gratuitous ARP for the cluster address; or starts advertising the cluster address in routing packets.

345: This transition is triggered when the RM 230 (FIG. 2) informs the MM 240 that the reach-ability order has changed. The transition is not executed if the cache of the standby is not synchronized with the active FTR-CR.

346: This transition is triggered by a cache synchronized event issued by the SM 220 (FIG. 2), while the FTR-CR is in the standby state. The transition is controlled by the configuration and will only be executed if the FTR-CR role is configured PRIMARY and if the switch strategy is configured AUTOMATIC.

347: This transition is triggered by an operator command requesting a manual switch-over.

348: The timer t2 has expired, which indicates that for the period of t2, the standby did not received either the keep alive messages from the active FTR-CR, or any other message. This is the most basic failure case (these messages are sent over multiple links/paths). The standby FTR-CR performs action 351 while changing to active state; generates either a gratuitous ARP for the cluster address; or starts advertising the cluster address in routing packets.

355: The active FTR-CR received a switch-over event from the standby FTR-CR. The active FTR-CR responds by an accept-switch-over message and changes to standby state while performing action 341.

FIG. 4 is a flow chart of steps performed by the active reach-ability manager RM 230 shown in FIG. 2. As shown in step 410, the RM is first idle. In step 420, the RM is initialized via an operator command, for example, with the reach-ability set and a function. The RM next follows path 425 to step 430, where the RM enters a loop. In step 430, the active RM collects reach-ability information. The RM then follows path 435 to step 440, where the RM evaluates the reach-ability information using the specified function.

If the active FTR-CR has reach-ability which is equal to or better than any standby FTR-CR, then there is no significant change and path 445 is followed back to step 430, where the RM waits for the next reporting interval to end. If there is a significant change, the active RM follows path 446 to step 450, where the active RM computes a new order. Next, the active RM follows path 455 to step 460, where the active RM notifies its own MM 240 (FIG. 2) and the RMs of all the standby FTR-CRs of the change, such as a failure of the active FTR-CR. Thereafter, the RM follows path 465 back to step 430 and waits for the next reporting interval to end.

FIG. 5 is an overview of an alternate configuration of the FTR-CRs. As shown in FIG. 5, there are three FTR-CRs 100", 105", 500. Each of these FTR-CRs is connected to first and second clusters of servers 530, 540. Each FTR-CR is also connected to a network 150 through which client requests arrive. For this configuration, cluster 530 is represented by VIP A and cluster 540 is represented by VIP B. The FTR-CRs can be configured so that one FTR-CR 100" is a primary FTR-CR for the first cluster 530, another FTR-CR 105" is the primary FTR-CR for the second cluster 540, and the third FTR-CR 500 is the backup FTR-CR for both cluster 530, 540. The three FTR-CRs 100", 105", 500 could also be configured where one of the FTR-CRs, such as the third FTR-CR 500 is not used. Instead of three FTR-CRs, two FTR-CRs are used where one FTR-CR 100" is the primary FTR-CR for first cluster 530 and the backup for the second cluster 540, while the other FTR-CR 105" is the primary FTR-CR for the second cluster 540 and the backup FTR-CR for first cluster 530.

Figure 6:
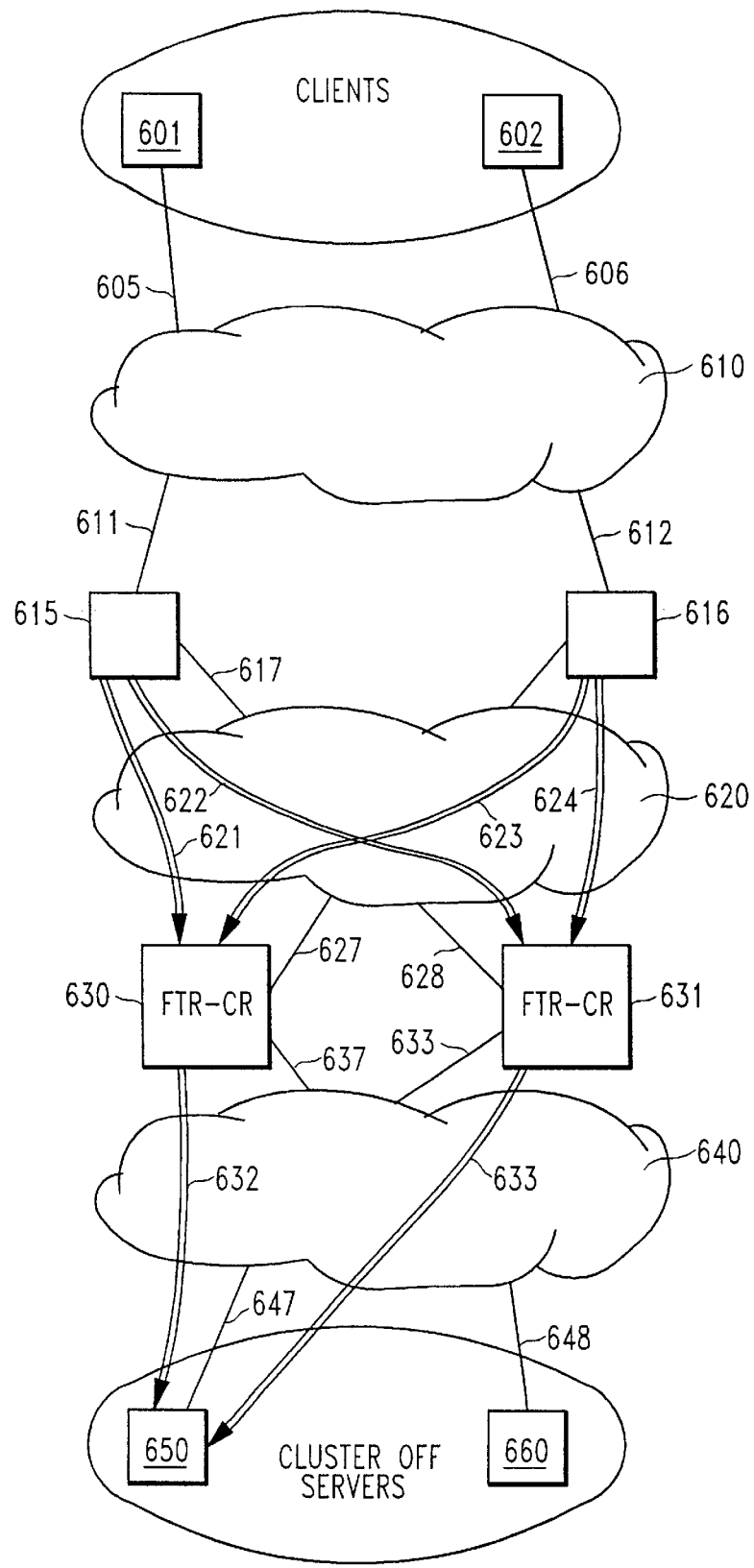
FIG. 6 illustrates failure scenarios for the FTR-CRs shown in FIG. 1 for failure detection through reach-ability comparison according to the present invention.

FIG. 6 shows illustrative reach-ability failures that can be detected. As shown in FIG. 6, clients 601, 602 are connected to two FTR-CRs 630, 631 thru networks 610, 620, which are public networks, for example, such as the Internet, a private network, or a combination of both. The FTR-CRs 630, 631 are also connected, through another network 640, to a cluster of servers, which include servers 650, 660.

For example, the reach-ability set in one of the FTR-CRs, such as FTR-CR 630, contains the intermediate hops 615, 616 and the addresses of some of the servers 650, 660. When this FTR-CR 630 is active, requests from clients 601, 602 logically flow to FTR-CR 630 through the network 610, hops 615 and/or 616, and network 620 via paths 621, 623. In turn, this FTR-CR 630 forwards some of the requests to server 650 using path 632, through the network 640.

The target reach-ability sets for the two FTR-CRs 630, 631 can be the same, such as routers 615, 616, and servers 650, 660. Alternatively, the target reachability sets of the two FTR-CRs 630, 631 can be different. For example, the target reach-ability set of the first FTR-CRs 630, includes router 615 and the server 650, whereas the target reach-ability set of the second FTR-CR 631, includes router 616 and the server 660.

In the latter case where the two FTR-CRs 630, 631 have different target reach-ability sets, the reach-ability manager RM 230 (FIG. 2) compares reach-ability set states of both FTR-CRs 630, 631. A configurable function in the RM 230 determines which FTR-CR has the best current reach-ability set.

When a failure occurs, for example, when router 615 fails, link 621 goes down, or when the first cluster of servers 650 fails, the RM 230 eventually finds that the second FTR-CR 631 has a better current reachability set than the first FTR-CR 630. Such a failure will be reported to the MM 240 (FIG. 2) by the RM 230 as a failure of the first FTR-CR 630. In response, the MM 240 will trigger a switch-over where the first FTR-CR 630 is switched from the active to the standby state, and the second FTR-CR 631 is switched from the standby to the active state.

As another illustrative example, it is assumed that the two FTR-CRs 630, 631 have the same reach-ability set, namely, router 615 and the first cluster of servers 650, and that the first FTR-CR 630 is the primary/active FTR-CR, while the second FTR-CR 631 is the backup/standby FTR-CR. The active RM 230 (FIG. 2) starts verifying that the two FTR-CR 630, 631 can reach and be reached by these two elements 615, 650 of the set.

If the link 627 between the first network 620 and the first FTR-CR 630 goes down, then the first FTR-CR 630 cannot reach/be reached by router 615. However, the second FTR-CR 631 can be reached by router 615 through link 628. The active RM 230 (FIG. 2) will report this as a failure of the first FTR-CR 630 to the standby RMs of all the FTR-CRs, and switch-over will be performed.

If the link 637 between the first FTR-CR 630 and the second network 640 goes down, the first FTR-CR 630 cannot reach/be reached by the first cluster of servers 650. However, the second FTR-CR 631 can be reached thru link 638. The active RM 230 (FIG. 2) will report to its own MM and to the RMs of all the standby FTR-CRs, which standby RMs, in turn, will report to their corresponding MMs the downed link 637 as a failure of the first FTR-CR 630, and switch-over will be performed.

If router 615 goes down, both FTR-CRs 630, 631 lose reach-ability to the router 615, and the active RM 230 (FIG. 2) will not report a failure. However, if the reach-ability sets of the two FTR-CRs 630, 631 were different, and FTR-CR 631 had router 616 instead of router 615 in its reach-ability set, then the active RM 230 would report to its own the MM 240, and to the RMs of all the standby FTR-CRs, the failure of router 615 and a switch-over would be triggered.

If the link 617 between the first network 620 and router 615 goes down, both FTR-CRs 630, 631 lose connectivity to router 615. Similar to the failure described in the previous paragraph, the failure of link 617 does not trigger a switch-over. However, in the case where the second FTR-CR 631 has a separate path to router 615, such as if the first network 620 was two independent networks that separately connect the two FTR-CRs 630, 630 to router 615, then the second FTR-CR 631 could still reach or be reached by router 615, and the active RM 230 reports to its own the MM 240, and to the RMs of all the standby FTR-CRs, a failure and causes a switch-over.

If the link 647 between the second network 640 and the first server 650 goes down, both FTR-CRs 630, 631 lose reach-ability to the first server 650, and the active RM 230 will not report a failure to its own MM 240, and to the RMs of all the standby FTR-CRS. However, if the reach-ability set of the two FTR-CRs 630, 631 were different, and the reach-ability set of the second FTR-CR 631 included the second server 660 instead of the first server 650, which can be reached using link 648, then the active RM 230 would report to its own MM 240, and to the RMs of all the standby FTR-CRS, the failure of the first FTR-CR 630 and trigger a switch-over, where the first FTR-CR 630 is switched from the active state to the standby state, and the second FTR-CR 631 is switched from the standby state to the active state.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A fault tolerant recoverable transport connection protocol/Internet protocol (TCP/IP) connection device to provide a connection between clients and one or more servers in a computer network, said TCP/IP connection device comprising at least two TCP/IP routers connected between said clients and said one or more servers, wherein when a first TCP/IP router of said at least two TCP/IP routers is in an active state to provide said connection between said clients and said one or more servers, then a second TCP/IP router of said at least two TCP/IP routers is in a standby state and capable of providing connection between said clients and said servers with same or different connectivity than said first TCP/IP router;

each of said at least two TCP/IP routers including:
a synchronization manager that synchronizes internal tables of said at least two TCP/IP routers;
a monitoring manager that monitors a state of said at least two TCP/IP routers; upon detecting a failure of said first TCP/IP router, said monitoring manager switching said second TCP/IP router from said standby state to said active state to maintain said connection, and switching said first TCP/IP router from said active state to said standby state; and,
a reach-ability manager which compares a TCP/IP router reach-ability state of each of said at least two TCP/IP routers with a required reach-ability set comprising a set of hosts or subnets to which connections are to be maintained, and which instructs said monitoring manager to switch states of said at least two TCP/IP routers when said second TCP/IP router is in the standby state and has a reach-ability state that includes said required reach-ability set and is better than said reach-ability set of said active TCP/IP router, whereby TCP/IP connectivity is maintained between said clients and said servers regardless of said connectivity configuration.

2. The fault tolerant recoverable TCP/IP connection device of claim 1, wherein each of said at least two TCP/IP routers further comprises a reach-ability manager which updates said router reach-ability state.

3. The fault tolerant recoverable TCP/IP connection device of claim 1, wherein each of said at least two TCP/IP routers further comprises a keep alive manager that monitors said at least two TCP/IP routers to provide a status notification to said monitoring manager.

4. The fault tolerant recoverable TCP/IP connection device of claim 1, wherein said monitoring manager is integrated into each of said at least two TCP/IP routers.

5. The fault tolerant recoverable TCP/IP connection device of claim 1, wherein said active and standby states are determined by workload information.

6. The fault tolerant recoverable TCP/IP connection device of claim 1, wherein said first router is a primary TCP/IP router and said second router is a backup TCP/IP router, said primary TCP/IP router and said backup TCP/IP router are determined by workload information.

7. The fault tolerant recoverable TCP/IP connection device of claim 1, wherein said at least two TCP/IP routers include a first primary TCP/IP router for a first cluster of said one or more servers, a second primary TCP/IP router for a second cluster of said one or more servers, and a backup TCP/IP router shared by said first and second cluster of said one or more servers.

8. The fault tolerant recoverable TCP/IP connection device of claim 1, wherein said first TCP/IP router is a primary TCP/IP router for a first cluster of said one or more servers and a backup router for a second cluster of said one or more servers, and said second TCP/IP router is a primary TCP/IP router for said second cluster of said one or more servers and a backup TCP/IP router for said first cluster of said one or more servers.

9. A fault tolerant recoverable transport connection protocol/Internet protocol (TCP/IP) connection device to provide a connection between clients and servers in a computer network, said TCP/IP connection device comprising a primary TCP/IP router and one or more backup TCP/IP routers which are connected between said clients and servers and capable of providing connection between said clients and said servers with same or different connectivity than said first TCP/IP router, said primary TCP/IP router and one of one or more said backup TCP/IP routers switching between an active state and a standby state to maintain either one of said primary TCP/IP router and one of said one or more backup TCP/IP routers in the active state for providing said connection between said clients and said servers; each of said primary TCP/IP router and said backup TCP/IP routers including a synchronization manager, a reach-ability manager, and a monitoring manager; wherein synchronization managers of said primary TCP/IP router and said one of said one or more backup TCP/IP router communicate with each other to synchronize internal tables of said primary TCP/IP router and said one of said one or more backup TCP/IP router; said monitoring managers of said primary TCP/IP router and said one of said one or more backup TCP/IP routers communicate with each other to monitor the state of said primary TCP/IP router and said one of said one or more backup TCP/IP router and perform the switching; said reach-ability managers of one of said primary TCP/IP and said one of said one or more back-up TCP/IP routers being active for collecting from said primary TCP/IP router and said one of said one or more backup TCP/IP router a reach-ability state, comparing the reach-ability states of each of said primary TCP/IP router and said one of said one or more backup TCP/IP router to determine which of said primary TCP/IP router and said one of said one or more backup TCP/IP router has optimum reach-ability to elements of a required reach-ability set; and, informing the monitoring manager for performing the switching in response to a TCP/IP router having an optimum reach-ability, whereby TCP/IP connectivity is maintained between said clients and said servers regardless of said connectivity configuration.

10. The fault tolerant recoverable TCP/IP connection device of claim 9, wherein each of said backup TCP/IP routers in the standby state monitors activities of said primary TCP/IP router in the active state so that internal tables of said primary TCP/IP router and said backup TCP/IP router are synchronized.

11. The fault tolerant recoverable TCP/IP connection device of claim 9, wherein the monitoring manager monitors the state of said primary TCP/IP router and said backup TCP/IP router for detecting a failure of one of said primary TCP/IP router and said backup TCP/IP router which is in the active state.

12. The fault tolerant recoverable TCP/IP connection device of claim 9, wherein the monitoring manager performs the switching in response to an operator command.

13. The fault tolerant recoverable TCP/IP connection device of claim 9, wherein said reach-ability set comprises information including hosts and subnets reachable by said connection device, said reach-ability manager of a primary TCP/IP router executing a configurable function to decide which connection device has an optimum current reach-ability.

14. The fault tolerant recoverable connection device of claim 9, wherein each of said primary TCP/IP router and said one or more TCP/IP backup routers further comprises a keep alive manager that monitors said primary TCP/IP router and said one or more TCP/IP backup routers to provide a status notification to said monitoring manager.

15. The fault tolerant recoverable connection device of claim 9, wherein said monitoring manager is integrated into each of said primary TCP/IP router and said backup TCP/IP router.

16. The fault tolerant recoverable connection device of claim 9, wherein said primary TCP/IP router and said backup TCP/IP router are determined by workload information.

17. The fault tolerant recoverable connection device of claim 9, wherein said active and standby states are determined by workload information.

18. The fault tolerant recoverable connection device of claim 9 further comprising another primary TCP/IP router for a cluster of servers, wherein said backup TCP/IP router is shared by said servers and said cluster of servers.

19. The fault tolerant recoverable connection device of claim 9, wherein said primary TCP/IP router of said of servers is a backup TCP/IP router for a cluster of servers, and said backup TCP/IP router of said of servers is a primary TCP/IP router for said cluster of servers.

20. A method of recovering from a failed connection between clients and a cluster of one or more servers comprising the steps of:

synchronizing internal tables of at least two fault tolerant recoverable transport connection protocol/Internet protocol (TCP/IP) routers connected between said clients and servers, a predetermined list of clients and servers reachable by each TCP/IP router comprising a reach-ability set, wherein when a first TCP/IP router of said at least two routers is in an active state to interconnect said clients and servers, then a second TCP/IP router of said at least two TCP/IP routers is in a standby state and capable of providing connection between said clients and said servers with same or different connectivity than said first TCP/IP router;

monitoring a state of said at least two TCP/IP routers;

detecting a failure of said first TCP/IP router;

switching said second TCP/IP router from said standby state to said active state to maintain interconnection between said clients and servers;

switching said first TCP/IP router from said active state to said standby state; and, collecting from said first TCP/IP router and said second TCP/IP router current reach-ability states;

enabling one of said first and second TCP/IP routers in an active state to compare reach-ability states of each of said first TCP/IP router and said second TCP/IP router with a required reach-ability set;

determining which of said first TCP/IP router and said second TCP/IP router has an optimum reach-ability; and switching a TCP/IP router from a stand-by to an active state in accordance with results of the determining step, whereby TCP/IP connectivity is maintained between said clients and said servers regardless of said connectivity configuration.

21. The method of claim 20, wherein the synchronizing step is performed by a synchronization manager of each of said at least two TCP/IP routers, and the monitoring step, the detecting step and both switching steps are performed by a monitoring manager of said at least two TCP/IP routers.

22. The method of claim 21, wherein said step of switching a TCP/IP router from a stand-by to an active state further comprises the step of:

instructing said monitoring manager to switch states of said at least two TCP/IP routers when said second TCP/IP router is in the standby state and has a reach-ability state which is better than a reach-ability state of said first TCP/IP router.

23. The method of claim 22, wherein the comparing step and the instructing step are performed by a reach-ability manager of said at least two TCP/IP routers.

24. The method of claim 20 further comprising updating the internal tables with current reach-ability states.

25. The method of claim 24, wherein the updating step is performed by each reach-ability manager of said at least two TCP/IP routers.

26. The method of claim 20 further comprising the steps of:

monitoring said at least two TCP/IP routers; and providing status notification to said monitoring manager.

27. The method of claim 26, wherein the monitoring step and the providing step are performed by a keep alive manager of said at least two TCP/IP routers.

28. A method of managing distribution of requests in a computer network of a type wherein a fault tolerant recoverable transport connection protocol/Internet protocol (TCP/IP) router distributes requests among multiple servers, comprising the steps of:

initializing a primary TCP/IP router in an active state and a backup TCP/IP router in a standby state, said backup TCP/IP router providing connection between said clients and said servers with same or different connectivity than said active TCP/IP router, said primary TCP/IP router and said backup TCP/IP router periodically receiving requests from the network and workload recommendations from the servers;

constructing a primary host connection table in the primary TCP/IP router and constructing a backup host connection table in the backup TCP/IP router based on the requests from the network and the workload recommendations, said workload recommendations being a function of capacities, availability and importance level of work running on the servers, the primary host connection table being synchronized with the backup host connection table;

distributing the requests according to the host connection table by the primary TCP/IP router in the active state;

sensing a failure from the primary TCP/IP router by a monitoring manager of one of the primary TCP/IP router and the backup TCP/IP router;

changing the backup TCP/IP router to the active state, in response to the failure;

distributing the requests by the backup TCP/IP router which is changed to the active state according to the backup host connection table in response to said changing the backup TCP/IP router to the active state; and changing the primary TCP/IP router to the standby state by the monitoring manager of the backup TCP/IP router, whereby TCP/IP connectivity is maintained between said clients and said servers regardless of said connectivity configuration.

29. The method of claim 28, wherein the initializing step is performed by a monitoring manager of the primary TCP/IP router.

30. The method of claim 28, wherein the constructing step is performed by a synchronization manager of each the primary TCP/IP router and the backup TCP/IP router.

31. The method of claim 28 further comprising communicating configuration information between the primary and backup routers so that configuration information of the primary router need not be reconstructed by the backup router to prevent delays in recovery of requests distributions when the primary router fails.

32. A method of switching between active and standby states of fault tolerant recoverable transport connection protocol/Internet protocol (TCP/IP) routers in a network having a primary TCP/IP router in an active state for providing a connection between clients and servers and a backup TCP/IP router in a standby state and capable of providing connection between said clients and said servers with same or different connectivity than said primary TCP/IP router comprising the steps of:

providing a reach-ability manager at each said primary TCP/IP and back-up TCP/IP router;

computing reach-ability set and state of said active TCP/IP router and reach-ability set and state of said standby TCP/IP router, said reach-ability manager of said back-up TCP/IP router reporting a reach-ability state to said reach-ability manager of said active TCP/IP router;

said active TCP/IP router implementing a configurable function for comparing the reach-ability set and state of said active TCP/IP router with the reach-ability set and state of said standby TCP/IP router; and switching said primary TCP/IP router from the active state to the standby state and said backup TCP/IP router from the standby state to the active state when the reach-ability set and state of said standby TCP/IP router are better than the reach-ability set and state of said active TCP/IP router, whereby TCP/IP connectivity is maintained between said clients and said servers regardless of said connectivity configuration.

* * * * *